(12) United States Patent  
Nambara et al.

(10) Patent No.: US 10,793,003 B2  
(45) Date of Patent: Oct. 6, 2020

(54) HEAD-UP DISPLAY DEVICE

(71) Applicant: DENSO CORPORATION, Kariya, Aichi-pref. (JP)

(72) Inventors: Takahiro Nambara, Kariya (JP); Mami Shiomi, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 92 days.

(21) Appl. No.: 16/086,645

(22) PCT Filed: Feb. 24, 2017

(86) PCT No.: PCT/JP2017/006971  
§ 371 (c)(1),  
(2) Date: Sep. 20, 2018

(87) PCT Pub. No.: WO2017/169375  
PCT Pub. Date: Oct. 5, 2017

(65) Prior Publication Data  
US 2019/0031028 A1  Jan. 31, 2019

(30) Foreign Application Priority Data  
Mar. 29, 2016  (JP) .................. 2016-065775

(51) Int. Cl.  
*B60K 35/00* (2006.01)  
*G02B 27/01* (2006.01)  
*B60R 1/00* (2006.01)

(52) U.S. Cl.  
CPC ............... *B60K 35/00* (2013.01); *B60R 1/00* (2013.01); *G02B 27/01* (2013.01);  
(Continued)

(58) Field of Classification Search  
CPC ........ G02B 27/0172; G02B 2027/0178; G02B 27/0176; G02B 27/0101; G02B 2027/0118  
(Continued)

(56) References Cited

U.S. PATENT DOCUMENTS

2009/0027589 A1  1/2009  Yamazoe et al.  
2014/0022645 A1*  1/2014  Matsuura ........... G02B 27/0101  
                                                       359/626  
(Continued)

FOREIGN PATENT DOCUMENTS

JP  2006310367 A  11/2006  
JP  2008122817 A   5/2008  
(Continued)

*Primary Examiner* — Mohammed A Hasan  
(74) *Attorney, Agent, or Firm* — Harness, Dickey & Pierce, P.L.C.

(57) ABSTRACT

Light emitting devices are aligned along one alignment direction. A first diffusion plate diffuses the illumination light from each of the light emitting devices. A condensing unit exerts a condensing action on the illumination light diffused with the first diffusion plate in a vertical direction perpendicular to the alignment direction. An image forming unit has an illumination target surface illuminated with the illumination light, which is condensed with the condensing unit, and allows a part of the illumination light incident on the illumination target surface to pass therethrough to form the image and to emit display light of the image as a light flux. A second diffusion plate is located on an optical path between the condensing unit and the image forming unit to again diffuse the illumination light condensed with the condensing unit and to cause the diffused illumination light to incident on the illumination target surface.

8 Claims, 4 Drawing Sheets

(52) U.S. Cl.
CPC .... *G02B 27/0101* (2013.01); *B60K 2370/334* (2019.05); *B60R 2300/205* (2013.01)

(58) Field of Classification Search
USPC ........................................................ 359/630
See application file for complete search history.

(56) References Cited

U.S. PATENT DOCUMENTS

| | | | |
|---|---|---|---|
| 2016/0299342 A1 | 10/2016 | Asai | |
| 2017/0276936 A1* | 9/2017 | Shihaku | ................ B60K 35/00 |

FOREIGN PATENT DOCUMENTS

| | | | |
|---|---|---|---|
| JP | 2010039387 | A | 2/2010 |
| JP | 2010153239 | A | 7/2010 |
| JP | 2011085700 | A | 4/2011 |
| JP | 2012203176 | A | 10/2012 |
| JP | 201555746 | A | 3/2015 |
| JP | 5866644 | B1 | 2/2016 |
| JP | 2016180922 | A | 10/2016 |

* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2017/006971 filed on Feb. 24, 2017. This application is based on and claims the benefit of priority from Japanese Patent Application No. 2016-065775 filed on Mar. 29, 2016. The entire disclosures of all of the above applications are incorporated herein by reference.

TECHNICAL FIELD

The present disclosure relates to a head-up display device mounted on a mobile object and configured to virtually display an image to be visible to an occupant.

BACKGROUND ART

Conventionally, a known head-up display device (hereinafter abbreviated as HUD device) is mounted on a mobile object and virtually displays an image in such a manner as to be visible to an occupant. The HUD device disclosed in Patent Literature 1 includes multiple light emitting devices, a diffusion plate, a condensing unit, and an image forming unit. Illumination light emitted from multiple light emitting devices aligned with each other along one alignment direction is diffused by the diffusion plate and then is condensed by the condensing unit. The illumination light condensed on the condensing unit illuminates an illumination target surface of the image forming unit, and a part of the illumination light passes through the image forming unit, to thereby form an image. The image is emitted as display light in the form of a light flux from the image forming unit.

In the above configuration of Patent Literature 1, the diffusion plate diffuses the illumination light emitted from the respective light emitting devices, so that the respective light emitting devices are formed into a surface light source. Further, since a light source image formed into the surface light source is enlarged by light condensing action of the condensing unit, an illuminance of a peripheral portion on the illumination target surface is restricted from decreasing relative to a central portion.

However, according to the principle of Helmholtz-Lagrange in geometrical optics, it is suggested that the spreading of the light flux of the display light of the image, which is emitted by the image forming unit, is reduced due to a reciprocal action of the light source image expansion by the condensing unit described above. In other words, a range in which a bright virtual image is visible to an occupant is narrowed. Therefore, there is room for improvement in the visibility of the virtual image.

PRIOR TECHNICAL LITERATURE

Patent Literature

PATENT LITERATURE 1: JP 2010-039387 A

SUMMARY OF INVENTION

The present disclosure aims at providing an HUD device with high visibility of a virtual image.

According to one aspect of the present disclosure, a head-up display device is mounted on a mobile object and is configured to project display light of an image onto a projection member to virtually display the image to be visible to an occupant. The head-up display device comprises a plurality of light emitting devices aligned with each other along one alignment direction. Each of the light emitting devices is configured to emit illumination light. The head-up display device further comprises a first diffusion plate configured to diffuse the illumination light emitted from each of the light emitting devices. The head-up display device further comprises a condensing unit configured to exert a condensing action on the illumination light, which is diffused with the first diffusion plate, in a vertical direction perpendicular to the alignment direction. The head-up display device further comprises an image forming unit having an illumination target surface to be illuminated with the illumination light condensed with the condensing unit. The image forming unit is configured to allow a part of the illumination light, which is incident on the illumination target surface, to pass therethrough to form the image and to emit display light of the image as a light flux. The head-up display device further comprises a second diffusion plate located on an optical path between the condensing unit and the image forming unit. The second diffusion plate is configured to again diffuse the illumination light condensed with the condensing unit and to cause the diffused illumination light to incident on the illumination target surface.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Hereinafter, an embodiment of the present disclosure will be described with reference to the drawings.

Figure 1:
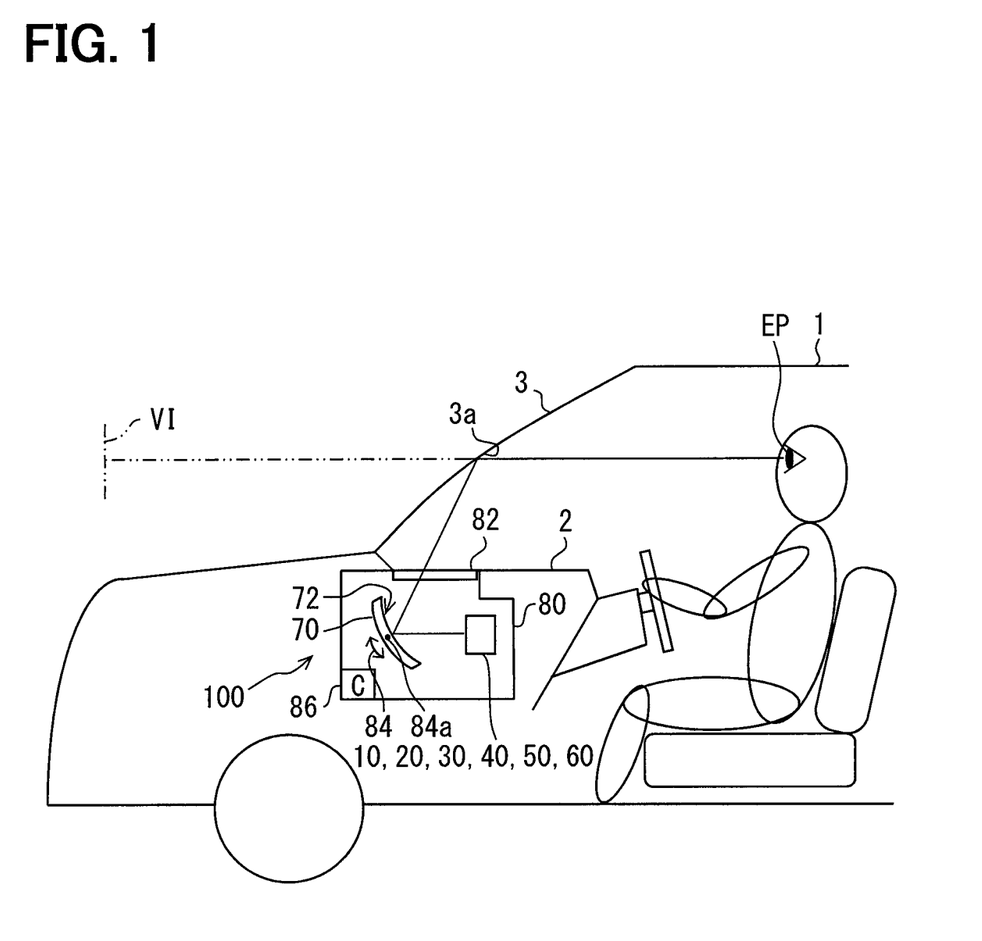
FIG. 1 is a schematic diagram illustrating a state in which an HUD device is installed in a vehicle according to an embodiment.

As illustrated in FIG. 1, an HUD device 100 according to an embodiment of the present disclosure is mounted in a vehicle 1 that is one type of a mobile object, and is installed in an instrument panel 2. The HUD device 100 projects display light of an image onto a windshield 3 which serves as a projection member of the vehicle 1. With the above configuration, the HUD device 100 virtually displays an image in such a manner as to be visible to an occupant in the vehicle 1. In other words, the display light of the image which is reflected on the windshield 3 reaches an eye point EP of an occupant in a vehicle interior of the vehicle 1, and the occupant senses the display light. The occupant is capable of recognizing various pieces of information which are displayed as a virtual image VI. Examples of various pieces of information which is displayed as the virtual image VI include vehicle state values such as a vehicle speed and a remaining fuel level, or vehicle information such as road information and visibility auxiliary information.

The windshield 3 of the vehicle 1 is formed in a plate-shape and made of a light transmissive glass, a synthetic resin and/or the like. On a surface of the windshield 3 on the vehicle interior side, a projection reflective surface 3a on which the display light of the image is reflected is shaped in a smoothly concave surface or a plane. As the projection member, the windshield 3 may be displaced by a configuration in which a combiner that is separate from the vehicle 1 is installed inside the vehicle 1, and the display light of the image is projected onto the combiner.

A specific configuration of the HUD device 100 described above will be described below. The HUD device 100 includes multiple light emitting devices 10, a lens array 20, a first diffusion plate 30, a cylindrical lens 40 as a condensing unit, a second diffusion plate 50, an image forming unit 60, and a concave mirror 70, and those components are accommodated and held in a housing 80.

Figure 2:
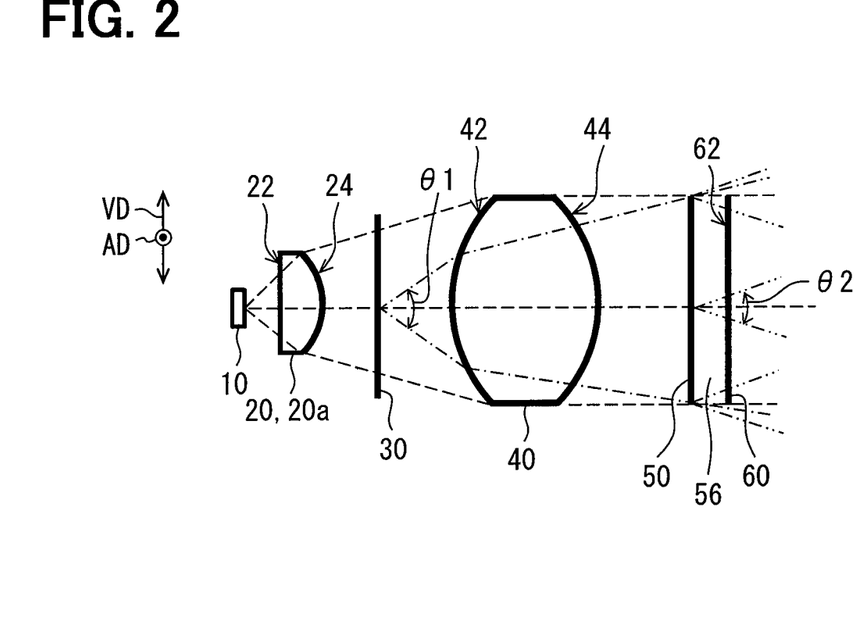
FIG. 2 is an optical path diagram schematically showing an optical path extending from a light emitting device to an image forming unit according to the embodiment, which views the optical path along an alignment direction.
Figure 3:
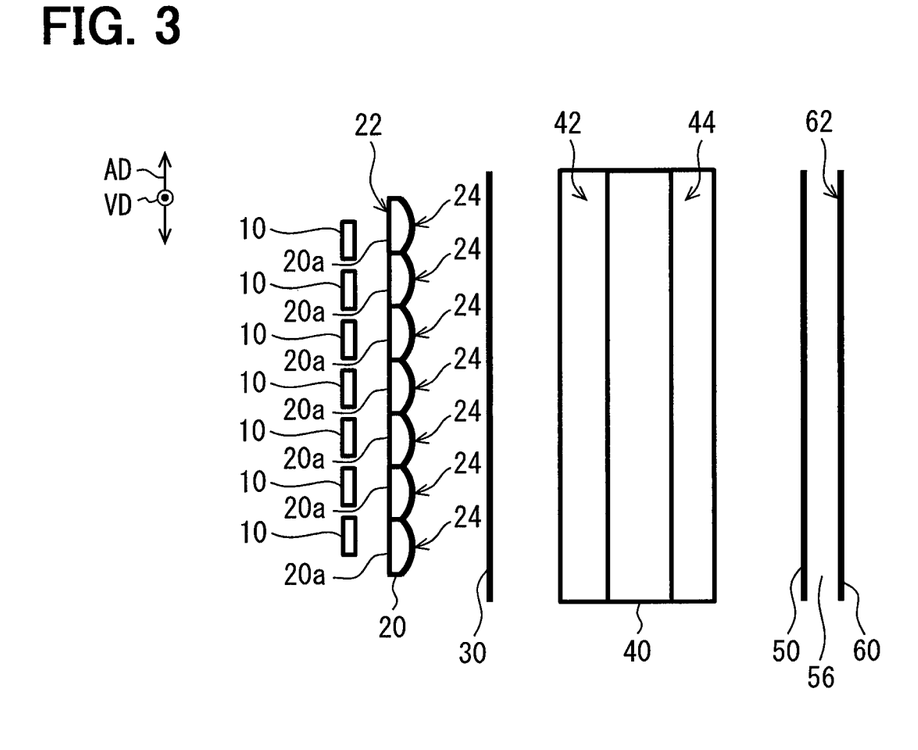
FIG. 3 is a diagram of the optical path viewed along a vertical direction in FIG. 2.

The multiple light emitting devices 10 illustrated in FIGS. 2 and 3 are aligned with each other along one alignment direction AD. In a vertical direction VD perpendicular to the alignment direction AD, the light emitting devices 10 are not aligned.

Each of the light emitting devices 10 is configured by a light emitting diode device with little heat generation. Each of the light emitting devices 10 is located on a light source circuit board and is electrically connected to a power supply through a wiring pattern on the board. In more detail, each of the light emitting devices 10 is formed by sealing a chip-shaped blue light emitting diode device with a yellow phosphor in which a light transmissive synthetic resin is mixed with a yellow fluorescent agent. The yellow phosphor is excited by the blue light emitted according to a current amount from the blue light emitting diode device to emit a yellow light, and illumination light of pseudo white is emitted by combination of the blue light with the yellow light.

The lens array 20 is located on an optical path between the light emitting devices 10 and the first diffusion plate 30. The lens array 20 is formed by aligning multiple lens elements 20a made of light transmissive synthetic resin, glass, or the like with each other along the alignment direction AD. In particular, in the present embodiment, the same number of the lens elements 20a as that of the light emitting devices 10 are provided. Optical surfaces 22 of the respective lens elements 20a on the side of the light emitting devices 10 form a single plane having a smooth plane common among the lens elements 20a. An optical surface 24 of each lens element 20a on the side of the first diffusion plate 30 has a smoothly convex surface curved in a convex shape. The illumination light emitted from each of the light emitting devices 10 is condensed by a corresponding lens element 20a and then enters the first diffusion plate 30.

The first diffusion plate 30 is located on the optical path between the lens array 20 and the cylindrical lens 40. The first diffusion plate 30 is made of a light transmissive synthetic resin or glass or the like and formed in a plate shape. The first diffusion plate 30 is provided with fine irregularities on a surface thereof, or contains fine diffusing particles inside thereof, to thereby, for example, circularly diffuse an incident light.

In the present embodiment, a diffusion angle of the first diffusion plate 30 is larger than a diffusion angle of the second diffusion plate 50, and set to, for example, 20 degrees. In the present specification, the diffusion angle in the present embodiment represents an angle at which ½ of the luminance of the diffused light emitted in an incident direction without any change is observed when the light is incident in a direction perpendicular to the diffusion plate. The diffusion angle is also called "half value angle". Further, a haze value of the first diffusion plate 30 is 80% or more. The illumination light incident on the first diffusion plate 30 is diffused and then incident on the cylindrical lens 40.

The cylindrical lens 40 is located on the optical path between the first diffusion plate 30 and the second diffusion plate 50. The cylindrical lens 40 is made of a light transmissive synthetic resin or glass or the like. An optical surface 42 of the cylindrical lens 40 on the side of the first diffusion plate 30 is a smoothly convex surface curved in a convex shape. In detail, the optical surface 42 has a cylindrical surface shape having a generating line extending along the alignment direction AD. An optical surface 44 of the cylindrical lens 40 on the side of the second diffusion plate 50 is also a smoothly convex surface curved in a convex shape. In detail, the optical surface 44 has a cylindrical surface shape having a generating line extending along the alignment direction AD. The cylindrical lens 40 presents a biconvex lens shape by the surface shapes of the optical surfaces 42 and 44.

The illumination light incident after the diffusion is refracted by the two optical surfaces 42 and 44 which are cylindrical surfaces. As a result, the cylindrical lens 40 exerts a condensing action on the illumination light in the vertical direction VD. On the other hand, the condensing action is not substantially exerted on the alignment direction AD. A radius of curvature of each of the optical surfaces 42 and 44 in the vertical direction VD is set so that the illumination light condensed on the cylindrical lens 40 is incident on the second diffusion plate 50 in a state of a substantially collimated light flux in a cross section including the vertical direction VD.

The second diffusion plate 50 is located substantially parallel to the first diffusion plate 30 on an optical path between the cylindrical lens 40 and the image forming unit 60. The second diffusion plate 50 is made of a light transmissive synthetic resin, glass, and/or the like and formed in a plate shape. The second diffusion plate 50 is provided with fine irregularities on a surface thereof, or contains fine diffusing particles inside thereof, to thereby, for example, circularly diffuse an incident light. In the present embodiment, a diffusion angle 82 of the second diffusion plate 50 is smaller than a diffusion angle 81 of the first diffusion plate 30, and set to, for example, 10 degrees. The illumination light condensed on the cylindrical lens 40 and incident on the second diffusion plate 50 is diffused again by the second diffusion plate 50 and then illuminates an entire illumination target surface 62 of the image forming unit 60 at a predetermined illuminance or higher.

Further, the second diffusion plate 50 is spaced from the illumination target surface 62 of the image forming unit 60 with a gap 56. A distance between the second diffusion plate 50 and the image forming unit 60 is set to be smaller than a distance between the second diffusion plate 50 and a main plane of the cylindrical lens 40.

The image forming unit 60 is formed of, for example, a liquid crystal panel formed of thin film transistors (TFTs), which is an active matrix liquid crystal panel that is formed of multiple liquid crystal pixels arrayed in two-dimensional directions along the illumination target surface 62. In the image forming unit 60, a pair of polarizing plates, a liquid crystal layer that is sandwiched between the pair of polarizing plates, and the like are laminated on each other. Each of the polarizing plate has a property of transmitting light polarized in a predetermined direction and absorbing light deflected in a direction substantially perpendicular to the predetermined direction. The pair of polarizing plates is located substantially orthogonal to each other in the predetermined direction. The liquid crystal layer can rotate the polarization direction of the light incident on the liquid crystal layer according to an applied voltage by applying the voltage to liquid crystal pixels.

The image forming unit 60 according to the present embodiment is located such that the illumination target surface 62, which is the surface of the panel on the side of the second diffusion plate 50, is substantially parallel to the first diffusion plate 30 and the second diffusion plate 50. The image forming unit 60 can form the image by incidence of the illumination light on the illumination target surface 62 while controlling the light transmittance for each liquid crystal pixel. Color filters of mutually different colors (for example, red, green, and blue) are provided in adjacent liquid crystal pixels, and various colors are produced by a combination of those color filters.

In the manner described above, as shown in FIG. 4, the image forming unit 60 allows a part of the illumination light incident on the illumination target surface 62 to pass therethrough to form the image, and emits display light of the image as a light flux.

In this example, in the image forming unit 60, the multiple liquid crystal pixels are arrayed in a rectangular region so that the illumination target surface 62 is formed in a rectangular shape. In the present embodiment, the alignment direction AD of the multiple light emitting devices 10 corresponds to a longitudinal direction of the illumination target surface 62, and the vertical direction VD corresponds to a short direction of the illumination target surface 62. Therefore, the cylindrical lens 40 exerts the condensing action on the illumination light in the short direction of the illumination target surface 62.

Figure 4:
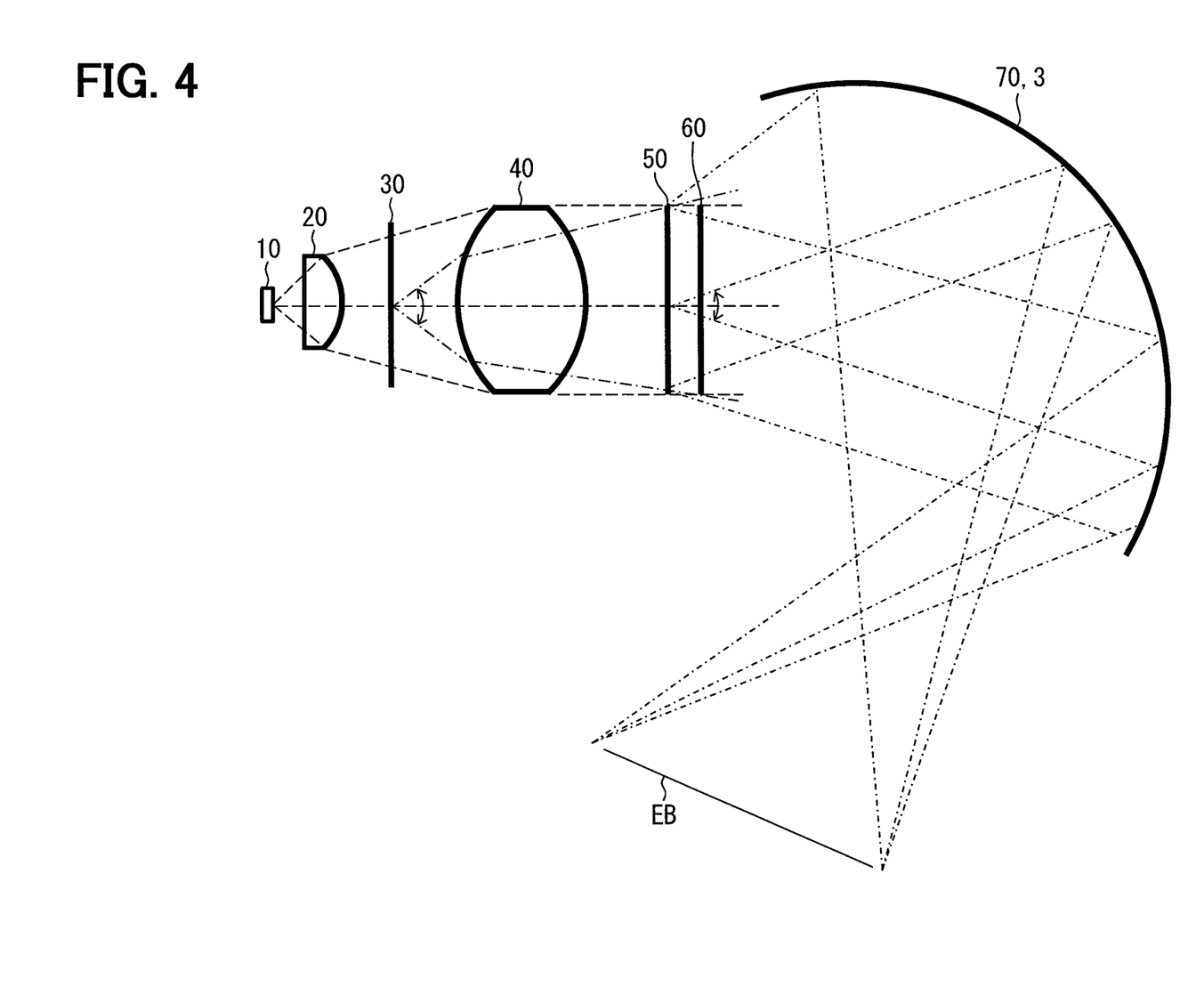
FIG. 4 is a schematic view illustrating the spreading of a light flux of display light of an image emitted by the image forming unit.

As shown in FIGS. 1 and 4, the concave mirror 70 is located on an optical path between the image forming unit 60 and the windshield 3. The concave mirror 70 is formed by depositing aluminum as a reflection surface 72 on a surface of a base material made of synthetic resin or glass. The reflection surface 72 has a smoothly concave surface curved in a concave shape. The display light of the image emitted in the light flux form from the image forming unit 60 is reflected on the reflection surface 72 toward the windshield 3.

In this example, the HUD device 100 according to the present embodiment is equipped with a rotation mechanism 84 that rotates the concave mirror 70 for the purpose of adjusting an image forming position of a virtual image VI. The rotation mechanism 84 can rotate the concave mirror 70 about a rotation axis 84a according to a drive signal from a control unit 86 which is electrically connected to the rotation mechanism 84. For example, since the rotation axis 84a extends along the alignment direction AD and the longitudinal direction of the illumination target surface 62, when the concave mirror 70 rotates about the rotation axis 84a, an image forming position of the virtual image VI moves in a direction corresponding to the short direction of the illumination target surface 62.

A window portion is provided in the housing 80 between the concave mirror 70 and the windshield 3. The window portion is covered with a dustproof cover 82 formed in a light transmissive plate-shape. Therefore, the display light of the image from the concave mirror 70 passes through the dustproof cover 82 and is reflected by the windshield 3. In FIG. 4, the concave mirror 70 and the windshield 3 are shown together. The display light of the image reflected on the windshield 3 in this manner makes the bright virtual image display visible to the occupant in a range EB.

(Operational Effects)

The operational effects according to the present embodiment described above will be described below.

According to the present embodiment, the first diffusion plate 30 diffuses the illumination light emitted from each of the light emitting devices 10. In this way, the respective light emitting devices 10 are formed into a surface light source, thereby being enabled to reduce an illumination unevenness in the alignment direction AD which may be caused according to alignment intervals of the respective light emitting devices 10. Since the light source image formed into the surface light source is expanded in the vertical direction VD by the condensing action of the cylindrical lens 40 as the condensing unit in the vertical direction VD, the illuminance of the peripheral portion in the vertical direction VD is restricted from decreasing as compared with the central portion.

In this example, the second diffusion plate 50 is located on an optical path between the cylindrical lens 40 and the image forming unit 60. Therefore, even in a case where the spreading of the illumination light after condensing is once reduced through the cylindrical lens 40, the illumination light is diffused again by the second diffusion plate 50. Subsequently, a part of the illumination light passes through the image forming unit 60. The spreading of the light flux of the display light of the image emitted from the image forming unit 60 in this way is adjusted by the second diffusion plate 50. Therefore, while the efficient illumination on the illumination target surface 62 is achieved by the multiple light emitting devices 10 aligned with each other along one alignment direction AD, the range EB in which the bright virtual image VI is visible to the occupant can be restricted from being narrowed. As described above, the HUD device 100 with high visibility of the virtual image VI can be provided.

Further, according to the present embodiment, the respective light emitting devices 10 can be formed into the surface light source by the diffusion angle 81 of the first diffusion plate 30 larger than the diffusion angle 82 of the second diffusion plate 50. At the same time, a state in which the display light of the image is excessively spread to reduce the luminance of the virtual image VI can be restricted by the diffusion angle 81 of the second diffusion plate 50, which is smaller than the diffusion angle 82 of the first diffusion plate 30.

Further, according to the present embodiment, the second diffusion plate 50 is spaced from the image forming unit 60 with the gap 56. With the configuration described above, for example, even in a case where an external light such as sunlight incident on the inside of the HUD device 100 in a direction opposite to the display light of the image reaches the image forming unit 60 to raise heat in the image forming unit 60, the heat can be radiated through the gap 56, thereby making it difficult for the heat to be transferred to the second diffusion plate 50. Therefore, the deterioration in function due to the influence of the heat can be restricted.

In addition, according to the present embodiment, the cylindrical lens 40 serving as the condensing unit exerts the condensing action by the cylindrical optical surfaces 42 and 44 whose generating line extends along the alignment direction AD. With such a condensing action, since the light source image can be restricted from being enlarged in the alignment direction AD, the illumination unevenness in the alignment direction AD which can occur according to the alignment intervals of the respective light emitting devices 10 is unlikely to be conspicuous. Therefore, the HUD device 100 with high visibility of the virtual image can be provided.

OTHER EMBODIMENTS

Hitherto, an embodiment of the present disclosure has been described. However, this disclosure is not construed as limited to the embodiment, and can be applied to various embodiments within the scope not departing from the gist of this disclosure.

In Modification 1, the second diffusion plate 50 may be placed in a state of being bonded to the illumination target surface 62 of the image forming unit 60.

Figure 5:
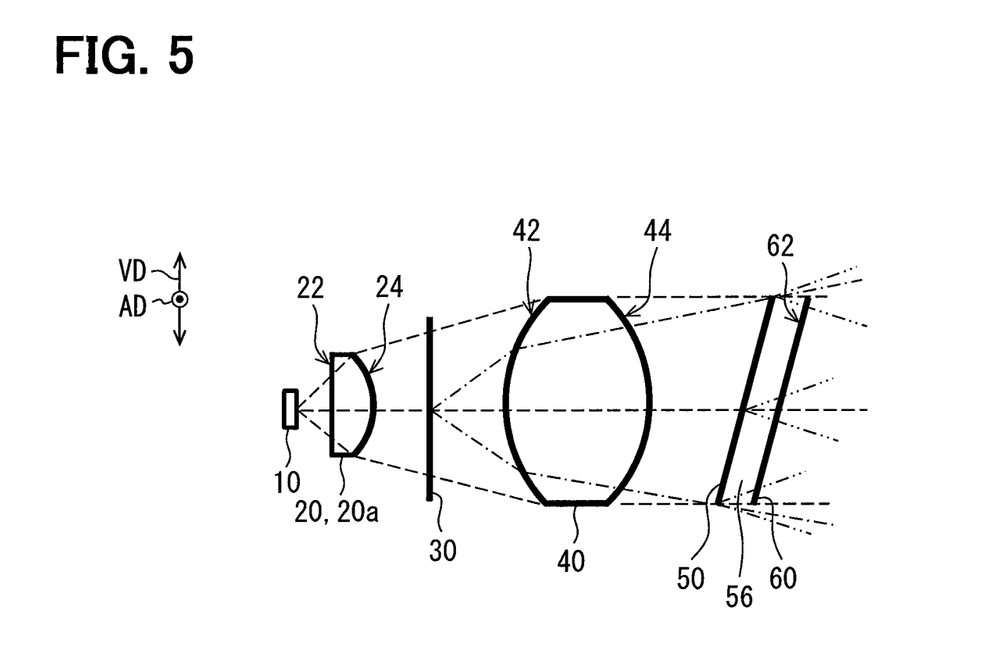
FIG. 5 is a diagram corresponding to FIG. 2 in Modification 2.

In Modification 2, as shown in FIG. 5, the image forming unit 60 may be located in a state where the illumination target surface 62 is inclined with respect to the first diffusion plate 30, and the second diffusion plate 50 may be located substantially in parallel to the illumination target surface 62. In FIG. 5, the image forming unit 60 and the second diffusion plate 50 are inclined in the short direction (in other words, the vertical direction VD).

Figure 6:
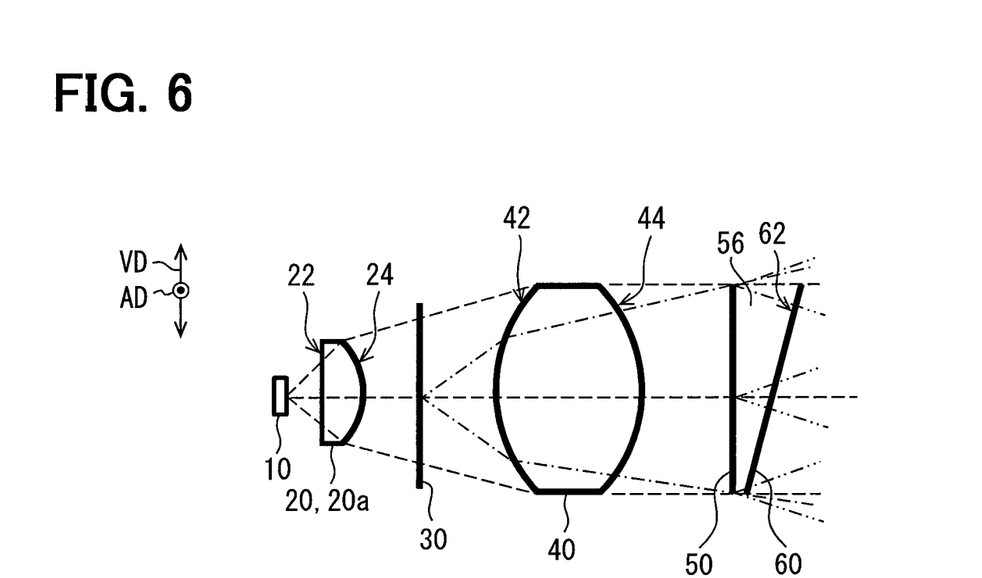
FIG. 6 is a diagram corresponding to FIG. 2 in Modification 3.

In Modification 3, as shown in FIG. 6, the image forming unit 60 may be located in a state where the illumination target surface 62 is inclined with respect to the first diffusion plate 30 and the second diffusion plate 50. In FIG. 6, the image forming unit 60 is inclined in the short direction (in other words, the vertical direction VD).

In Modification 4, the optical surfaces 42 and 44 may have a cylindrical surface shape whose generating line slightly deviates from the alignment direction AD as long as the optical surfaces 42 and 44 exert the condensing action in the vertical direction VD.

In Modification 5, the cylindrical lens 40 as the condensing unit may have a plano-convex lens shape.

In Modification 6, the condensing unit may be configured by an optical element other than the cylindrical lens 40, or may be configured by a combination of multiple optical elements.

In Modification 7, another optical element may be added on the optical path between the image forming unit 60 and the windshield 3.

In Modification 8, the second diffusion plate 50 may have a property of elliptically diffusing an incident light.

In Modification 9, the present disclosure may be applied to various mobile objects (transportation equipment) such as vessels or aircraft other than the vehicle 1.

The head-up display device described above is mounted on the mobile object 1 and projects display light of an image on the projection member 3 to virtually display the image in such a manner as to be visible to the occupant. The multiple light emitting devices 10 are aligned with each other along one alignment direction AD and each emit the illumination light. The first diffusion plate 30 diffuses the illumination light emitted from each of the light emitting devices. The condensing unit 40 exerts the condensing action on the illumination light diffused by the first diffusion plate in the vertical direction VD perpendicular to the alignment direction. The image forming unit 60 has the illumination target surface 62 to be illuminated with the illumination light condensed on the condensing unit, and allows passing of a part of the illumination light incident on the illumination target surface to form the image, and emits the display light of the image as a light flux. The second diffusion plate 50 is located on the optical path between the condensing unit and the image forming unit, again diffuses the illumination light condensed on the condensing unit, and causes the diffused illumination light to incident on the illumination target surface.

According to the configuration described above, the first diffusion plate diffuses the illumination light emitted from each of the light emitting devices. In this way, the respective light emitting devices is formed into a surface light source, thereby to enable to reduce an illumination unevenness in the alignment direction which may be generated according to alignment intervals of the respective light emitting devices. Since the light source image formed into the surface light source is expanded in the vertical direction by the condensing action by the condensing unit in the vertical direction, the illuminance of the peripheral portion in the vertical direction is restricted from decreasing as compared with the central portion.

In this example, the second diffusion plate is located on the optical path between the condensing unit and the image forming unit. Therefore, even if the spreading of the illumination light after condensing is temporarily reduced by the condensing unit, after the illumination light has been diffused again by the second diffusion plate, the illumination light passes through the image forming unit. The spreading of the light flux of the display light of the image emitted from the image forming unit in this way is adjusted by the second diffusion plate. Therefore, while the efficient illumination on the illumination target surface is realized by the multiple light emitting devices aligned with each other along one alignment direction, the range in which the bright virtual image is visible to the occupant can be restricted from being narrowed. As described above, the HUD device with high visibility of the virtual image can be provided.

The present disclosure has been described based on the embodiments; however, it is understood that this disclosure is not limited to the embodiments or the structures. The present disclosure includes various modification examples and modifications within the equivalent range. In addition, it should be understood that various combinations or aspects, or other combinations or aspects, in which only one element, one or more elements, or one or less elements is included to the various combinations or aspects, are included in the scope or the technical idea of the present disclosure.

What is claimed is:

1. A head-up display device mounted on a mobile object and configured to project display light of an image onto a projection member to virtually display the image to be visible to an occupant, the head-up display device comprising:
 a plurality of light emitting devices aligned with each other along one alignment direction, each of the light emitting devices configured to emit illumination light;
 a first diffusion plate configured to diffuse the illumination light emitted from each of the light emitting devices;
 a condensing unit configured to exert a condensing action on the illumination light, which is diffused with the first diffusion plate, in a vertical direction perpendicular to the alignment direction;
 an image forming unit having an illumination target surface to be illuminated with the illumination light, which is condensed with the condensing unit, the image forming unit configured to allow a part of the illumination light, which is incident on the illumination target surface, to pass therethrough to form the image and to emit display light of the image as a light flux; and a second diffusion plate located on an optical path between the condensing unit and the image forming unit, the second diffusion plate configured to again diffuse the illumination light, which is condensed with the condensing unit, and to cause the diffused illumination light to incident on the illumination target surface, wherein a diffusion angle of the second diffusion plate is smaller than a diffusion angle of the first diffusion plate.

2. The head-up display device according to claim 1, wherein the second diffusion plate is spaced from the image forming unit with a gap.

3. The head-up display device according to claim 1, wherein the condensing unit is configured to exert a condensing action with a cylindrical optical surface having a generating line extending along the alignment direction.

4. The head-up display device according to claim 1, wherein the condensing unit is a cylindrical lens.

5. The head-up display device according to claim 4, wherein the cylindrical lens has an optical surface on a side of the first diffusion plate, and the optical surface is a smoothly convex surface curved in a convex shape.

6. The head-up display device according to claim 5, wherein the optical surface has a cylindrical surface shape having a generating line extending along the alignment direction.

7. The head-up display device according to claim 6, wherein the light emitting devices include at least three light emitting devices aligned with each other along the alignment direction.

8. The head-up display device according to claim 7, further comprising:

a lens array located between the light emitting devices and the first diffusion plate, wherein the lens array includes a plurality of lens elements aligned with each other along the alignment direction.

* * * * *